(12) United States Patent
Stirniman et al.

(10) Patent No.: US 6,589,641 B1
(45) Date of Patent: Jul. 8, 2003

(54) THIN FILMS OF CROSSLINKED FLUOROPOLYMER ON A CARBON SUBSTRATE

(75) Inventors: Michael J. Stirniman, San Jose, CA (US); Samuel J. Falcone, San Jose, CA (US); Li-Pang Wang, Fremont, CA (US); Kevin J. Grannen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/323,510

(22) Filed: Jun. 1, 1999

Related U.S. Application Data
(60) Provisional application No. 60/088,329, filed on Jun. 4, 1998, and provisional application No. 60/088,130, filed on Jun. 4, 1998.

(51) Int. Cl.$^7$ .............................................. G11B 5/725
(52) U.S. Cl. ........................ 428/216; 428/336; 428/408; 428/421; 428/422; 428/694 TC; 428/694 TF; 428/900
(58) Field of Search ................... 428/216, 336, 428/408, 421, 422, 694 TC, 694 TF, 900

(56) References Cited

U.S. PATENT DOCUMENTS

| | | |
|---|---|---|
| 3,025,279 A | 3/1962 | Barr |
| 3,104,983 A | 9/1963 | Tarwater et al. |
| 3,810,874 A | 5/1974 | Mitsch et al. |
| 3,814,741 A | 6/1974 | Caporiccio et al. |
| 4,132,681 A | 1/1979 | Field et al. |
| 4,404,247 A | 9/1983 | Dominguex-Burguette et al. |
| 4,446,193 A | 5/1984 | Afzali-Ardakani et al. |
| 4,486,500 A | 12/1984 | Naruo et al. |
| 4,526,833 A | 7/1985 | Burguette et al. |
| 4,543,275 A | 9/1985 | Akashi et al. |
| 4,569,962 A | 2/1986 | Burguette et al. |
| 4,588,656 A | 5/1986 | Kitamoto et al. |
| 4,642,246 A | 2/1987 | Jassen et al. ............... 427/127 |
| 4,645,703 A | 2/1987 | Suzuki et al. |
| 4,671,999 A | 6/1987 | Burguette et al. |
| 4,681,925 A | 7/1987 | Strepparola et al. |
| 4,686,146 A | 8/1987 | Karle et al. |
| 4,699,835 A | 10/1987 | Takeuchi et al. |
| 4,701,375 A | 10/1987 | Nishimatsu et al. |
| 4,705,699 A | 11/1987 | Burguette et al. |
| 4,721,640 A | 1/1988 | Kato et al. |
| 4,758,471 A | 7/1988 | Arioka et al. |

(List continued on next page.)

OTHER PUBLICATIONS

"Enhanced Tribological Performance of Rigid Disk by Using Chemically Bonded Lubricant" by, H.J. Lee et al., J. Vac., Sci. Technol. A 11(3), May/Jun. 1993, pp. 711–714.

"The Mechanism of Ultraviolet Bonding of Perfluoropolyether Lubricants" by, Vurens et al., IEEE Transactions on Magnetics, vol. 29, No. 1, Jan. 1993, pp. 282–285.

"Tribological Characteristics of Liquid Lubricant on Magnetic Disks Treated by Far–UV Radiation" by, Tian et al., Journal of Tribology, vol. 115, Jul. 1993, pp. 400–405.

*Primary Examiner*—Stevan A. Resan
(74) *Attorney, Agent, or Firm*—McDermott, Will & Emery

(57) ABSTRACT

A material, preferably a magnetic data storage disc, includes a carbon layer covering at least a portion of a magnetic substrate and a crosslinked fluoropolymer layers covering at least-a portion of the carbon layer. The crosslinked polymer layer has a thickness less than about 40 angstroms, and the carbon layer has a thickness less than about 100 angstroms. Preferred fluoropolymers include, for example, perfluoropolyethers. In some embodiments, the crosslinked fluoropolymer layer has a thickness at one point on the carbon layer greater than the thickness crosslinked fluoropolymer layer at another point on the carbon layer. The crosslinking generally is performed by irradiating the lubricant material on the carbon layer.

13 Claims, 4 Drawing Sheets

U.S. PATENT DOCUMENTS

| | | |
|---|---|---|
| 4,828,899 A | 5/1989 | Arioka et al. |
| 4,835,032 A | 5/1989 | Arioka et al. |
| 4,849,291 A | 7/1989 | Yacobucci et al. |
| 4,880,687 A | 11/1989 | Yokoyama et al. |
| 4,960,609 A | 10/1990 | Homola et al. ............... 427/38 |
| 4,992,316 A | 2/1991 | Ogawa |
| 5,030,478 A | 7/1991 | Lin et al. |
| 5,049,410 A | 9/1991 | Johary et al. ............... 427/131 |
| 5,055,359 A | 10/1991 | Tsuno et al. ................ 428/448 |
| 5,080,982 A | 1/1992 | Yamamoto et al. |
| 5,118,525 A | 6/1992 | Chino et al. |
| 5,143,787 A | 9/1992 | Frew et al. ................. 428/408 |
| 5,178,954 A | 1/1993 | Norman et al. |
| 5,188,747 A | 2/1993 | Kai et al. |
| 5,266,724 A | 11/1993 | Kai et al. |
| 5,279,877 A | 1/1994 | Uchiyama et al. ............ 428/64 |
| 5,331,487 A | 7/1994 | Gregory et al. .......... 360/97.02 |
| 5,409,738 A | 4/1995 | Matsunuma et al. |
| 5,534,322 A | 7/1996 | Ueyama et al. |
| 5,543,203 A | 8/1996 | Tani et al. |
| 5,545,478 A | 8/1996 | Lin et al. |
| 5,591,481 A | 1/1997 | Takahashi et al. |
| 5,618,617 A | 4/1997 | Uchida et al. |
| 5,618,639 A * | 4/1997 | Ohno ..................... 428/694 T |
| 5,631,041 A | 5/1997 | Kanzizuka et al. |
| 5,631,081 A * | 5/1997 | Lin et al. .................... 428/332 |
| 5,650,900 A | 7/1997 | Wei et al. |
| 5,661,618 A | 8/1997 | Brown et al. |
| 5,783,320 A | 7/1998 | Shimazaki et al. |
| 5,858,536 A | 1/1999 | Yanagisawa ................ 428/408 |
| 5,874,169 A | 2/1999 | Falcone |
| 5,912,061 A | 6/1999 | Uchida et al. |
| 5,919,560 A | 7/1999 | Nishimori |
| 6,068,911 A * | 5/2000 | Shouji et al. ............... 428/143 |
| 6,071,609 A | 6/2000 | Furutani et al. |
| 6,096,385 A | 8/2000 | Yong et al. |
| 6,096,694 A | 8/2000 | Tei et al. |
| 6,099,762 A | 8/2000 | Lewis |
| 6,110,584 A * | 8/2000 | Hiratsuka et al. ........... 428/336 |

\* cited by examiner

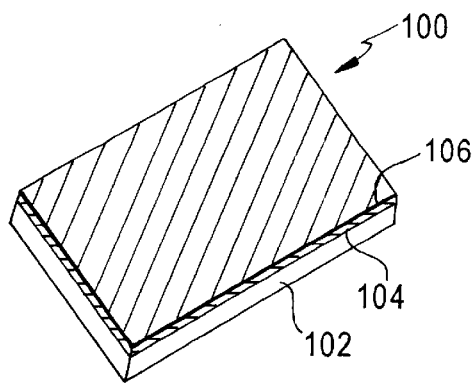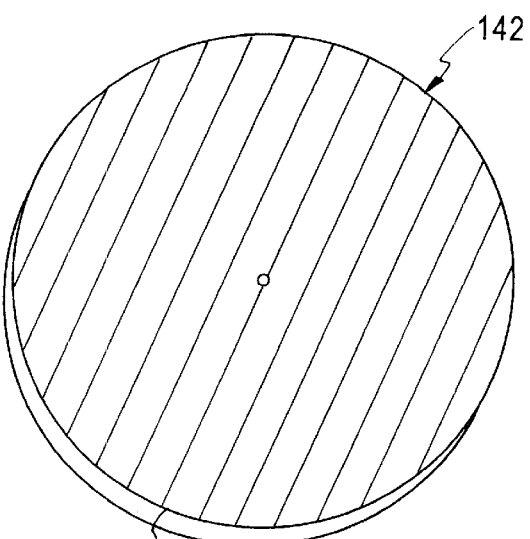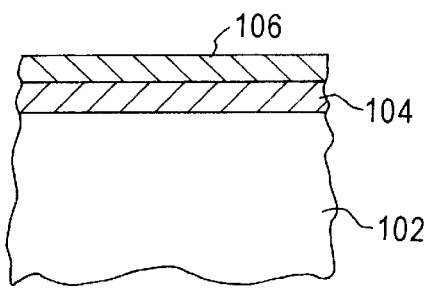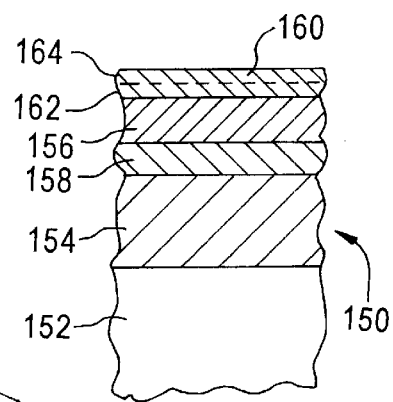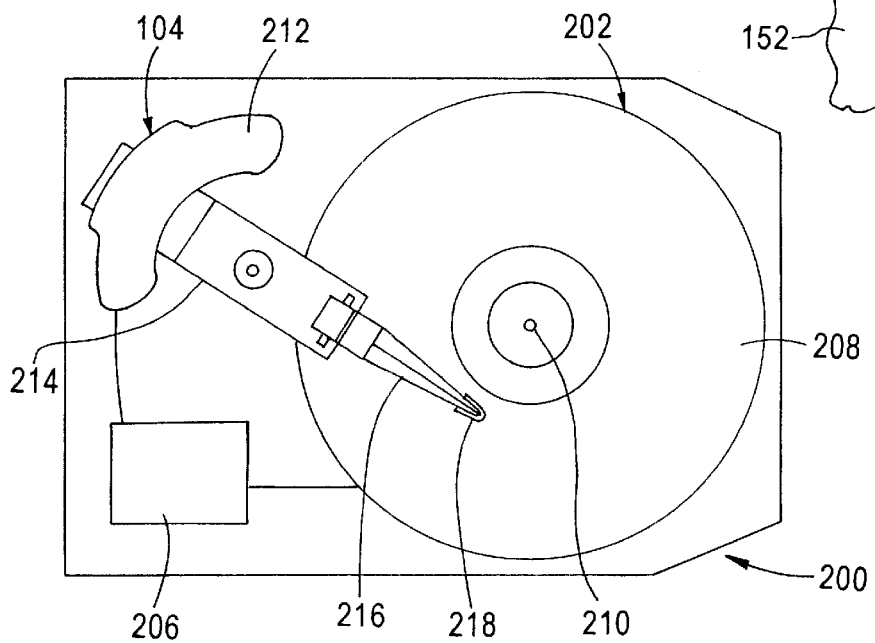

THIN FILMS OF CROSSLINKED FLUOROPOLYMER ON A CARBON SUBSTRATE

CROSS REFERENCE TO RELATED APPLICATION

This application claims priority under U.S. Provisional Application Serial No. 60/088,329 filed on Jun. 4, 1998, entitled "CROSS LINKED FLUOROCARBON BARRIER COATING FOR THIN CARBON FILMS," incorporated herein by reference, and under U.S. Provisional Application Serial No. 60/088,130 filed on Jun. 4, 1998, entitled "METHOD OF PRODUCING A ZONED SOLID LUBRICATED LAYER/BARRIER COATING," incorporated herein by reference.

BACKGROUND OF THE INVENTION

The invention relates to films of crosslinked fluoropolymer that serve as lubrication and/or protection coatings. The invention more particularly relates to magnetic storage media having a crosslinked fluoropolymer lubricant layer.

Advances in many technologies have created enhanced demands on materials used in the production of a variety of devices. Specifically, miniaturization has decreased tolerance levels while increasing performance requirements. Furthermore, coating technology has become extremely important since coatings can be used to alter the surface properties of the composite while maintaining desirable properties of the underlying substrate. In particular, thin coatings can serve to protect the underlying substrate from a variety of assaults.

Data storage discs for the electronic storage of information are a device of particular interest. Disc drives for data storage can use one or more data storage discs with a magnetic medium for the storage of information. The magnetic medium generally is formed by a relatively thin magnetic layer on a non-magnetic substrate. Typically, the data is stored at specific locations along concentric data tracks. The disc drive assemblies for magnetic data storage include head/gimbal assemblies aligned with the disc surface. The head/gimbal assemblies support transducers, such as magnetoresistive elements, for reading data from and/or writing data to the data tracks near the disc surface.

The read/write head generally includes an air bearing surface, which faces the disc surface. As the disc rotates, the disc drags air along the air bearing surface. As the air passes along the air bearing surface, the air pressure between the disc surface and the air bearing surface creates a hydrodynamic lifting force that causes the slider or head to deflect away from the disc surface. Prior to rotation of the disc, the slider rests on the disc surface. The hydrodynamic lift is affected by the speed of rotation of the disc, the design of the air bearing surface of the read/write head, and the preload force supplied to the head by the gimbal assembly.

Discs can include separate landing zones and data storage zones on the disc surface. Information is stored in the magnetic media within the data storage zones. The landing zones are used to support the slider when the disc is not rotating. The landing zones also provide a takeoff and landing surface for the read/write head. The landing zone portion of the disc surface preferably is not used for data storage since repeated contact with the read/write head can destroy stored data in the magnetic medium near the disc surface.

To obtain higher storage densities on the disc surface, fly heights between the read/write head and the disc surface are being reduced. Reducing the fly height improves the magnetic interaction between the head and the disc surface to allow correspondingly higher storage densities. Thus, it is important that the disc surface is sufficiently smooth for a particular fly height to reduce contacts between the read/write head and the disc surface. Contact between the read/write head and the disc surface can result in data loss and damage to the disc and/or the head.

Furthermore, intermittent contact between the head and the disc surface causes wear of the disc surface. To protect the disc surface from wear and corrosion, overcoats can be placed on the disc surface over the magnetic medium. Preferred overcoats reduce wear and friction while maintaining proper hydrodynamic interaction between the head and the disc surface during rotation and during take-off and landing.

Carbon coatings have been used to form protective layers on magnetic substrates. The coating, however, increases the spacing between the surface and the underlying substrate. Thus, for example in the production of magnetic discs, any performance improvement resulting from a reduction in fly height can be countered by the presence of protective coatings and the like that result in an increased distance of the magnetic medium and the disc surface.

Furthermore, lubricant layers generally are used on magnetic disc surfaces to reduce wear and to decrease friction between the disc surface and the head. Perfluoropolyethers can be used to form the lubricant layer. A variety of approaches have been explored to secure the lubricant layer to the substrate such that the lubricant layer remains on the disc surface for a longer period of time.

SUMMARY OF THE INVENTION

In a first aspect, the invention pertains to a magnetic storage medium comprising:
 a first protection means for protecting a magnetic substrate, the first protection means comprising a carbon material; and
 a second protection means for protecting a magnetic substrate, the second protection means comprising a crosslinked fluoropolymer.

In another aspect, the invention pertains to a material comprising a magnetic substrate, a carbon layer covering at least a portion of the substrate and a crosslinked fluoropolymer layer covering at least a portion of a surface of the carbon layer, the crosslinked polymer layer having a thickness less than about 40 angstroms and the carbon layer having a thickness of less than about 100 angstroms.

In a further aspect, the invention pertains to a material comprising a magnetic substrate, a carbon layer covering at least a portion of the substrate and a crosslinked fluoropolymer layer covering at least a portion of a surface of the carbon layer, wherein the crosslinked fluoropolymer layer has a thickness at one point on the carbon layer greater by at least about 5 angstroms than the thickness at another point on the carbon layer.

Moreover, the invention pertains to a method of forming a lubrication layer of crosslinked fluoropolymer on a carbon substrate, the method comprising irradiating selected portions of the substrate with appropriate amounts of radiation to form a crosslinked fluoropolyer layer with different thicknesses of crosslinked polymer at different locations on the substrate.

BRIEF DESCRIPTION OF THE DRAWINGS

FIG. 1 is a schematic, perspective view of a substrate with a thin carbon coating.

FIG. 2 is a sectional side view of the substrate with a thin carbon coating of FIG. 1.

FIG. 3 is a perspective view of a magnetic storage disc with a thin carbon coating.

FIG. 4 is a sectional side view of an embodiment of a magnetic storage disc.

FIG. 5 is a schematic, top view of a disc drive system.

DETAILED DESCRIPTION OF THE PREFERRED EMBODIMENTS

Figure 6:
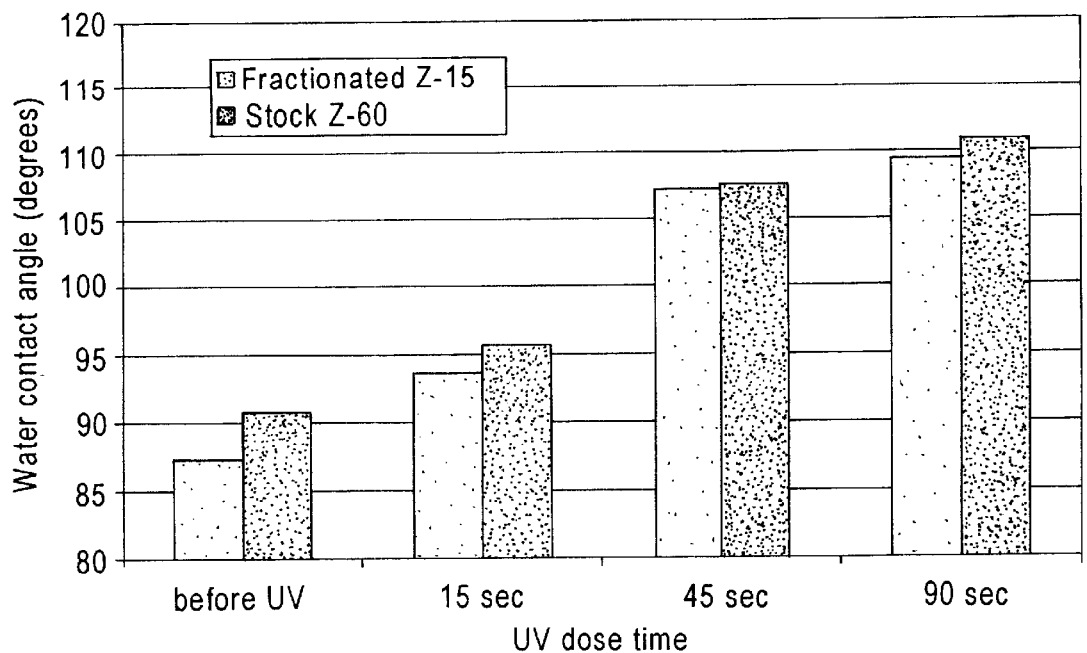
FIG. 6 is a histogram plotting the water contact angle for two different perfluoropolyethers at three different ultraviolet irradiation times.

Crosslinked fluoropolymer lubricant layers formed over a protective carbon layer provide protection against corrosion and wear in a synergistic fashion such that overall thickness of the protective coatings can be decreased. In particular, due to the corrosion inhibiting properties of a crosslinked fluoropolymer layer, a significantly thinner protective carbon layer can be used without diminishing the collective corrosion protection to unacceptable values. In preferred embodiments, a layer of crosslinked fluorinated polyether becomes bonded to the protective carbon layer during the crosslinking process. Radiation, preferably ultraviolet radiation, is used to crosslink the polymer adjacent to the carbon substrate. The thickness of the crosslinked portion of the lubricant layer can be adjusted by varying the length of time that the polymer is exposed to crosslinking radiation. The radiation can be directed during the crosslinking process to selected portions of the substrate to vary the crosslinked polymer thickness at different points along the-carbon surface.

Preferred structures include a lubricant layer over a carbon layer as protective layers that are applied to an underlying material. In preferred embodiments, the carbon layer is applied over a magnetic medium that is used for magnetic data storage. In particular, magnetic discs for electronic data storage have a magnetic layer used for data storage that can be coated with a protective carbon layer. In use, a read/write head or the like flies adjacent the disc surface when the disc is spinning. The head travels at a very small separation from the disc surface such that a lubricant layer improves performance at the head-disc interface.

Generally, the lubricant layer is relatively thin, such that the distance between the head and the magnetic layers are not increased too significantly due to the presence of the lubrication layer. Also, because of the sealing property of a crosslinked fluoropolymer lubricant layer, a thinner carbon layer can be used than would be acceptable without the lubricant layer. Without the synergistic protection provided by the combination of the thin carbon layer and the crosslinked fluoropolymer, a carbon layer thinner than 100 angstroms does not provide sufficient protection against corrosion in the form of oxidation and cobalt migration. Thus, a crosslinked fluorocarbon layer can be used effectively with a carbon layer having a thickness less than 100angstroms while providing adequate corrosion protection to a magnetic material under the carbon layer.

The lubricant layer serves to decrease friction between a head and the disc, to provide some additional protection against impact and to seal the surface to inhibit corrosion of underlying magnetic layers by water coming into contact with the surface. Fluorine containing polyethers are particularly preferred in the lubricant layer due to their hydrophobic character. Preferred compounds for forming the lubrication layer include perfluoropolyethers and hydrofluoropolyethers.

Suitable fluoropolyethers include unsubstituted perfluoropolyethers, such as Fomblin® Z-60 (average molecular weight (AMW)=about 60,000 atomic mass units (AMU) or Daltons), Fomblin® Z-25 (AMW=about 25,000 AMU) and Fomblin® Z-15 (AMW=about 15,000 AMU). The Fomblin® unsubstituted perfluoropolyethers made by Montedison (Ausimont) S.P.A., Milan, Italy have molecular formulas of $CF_3O(CF_2CF_2O)_n(CF_2O)_mCF_3$, where n and m vary to yield particular products with average molecular weights of specified values. Suitable fluorinated polyethers include perfluoropolyethers with functional end groups. Suitable difunctional perfluoropolyethers include, for example, Fomblin® Z-DOL (hydroxyl end groups), Fomblin® AM2001 (piperonyl end groups), and Fomblin® Z-DISOC (isocyanate end groups). Fluorinated polymers with functional end groups may bind to a carbon substrate without the need for crosslinking radiation. Other suitable perfluoropolyethers are available under the tradenames Demnum® from Daikin Kogyo Co., Japan and Krytox® from DuPont, Wilmington, Del., having a basic molecular formula of $F(CF_2CF_2CF_2)_nCF_2CF_3$.

Preferred unsubstituted fluorinated polyethers have average molecular weights less than about 100,000 AMU, preferably less than about 25,000 and more preferably from about 6000 AMU to about 15,000 AMU. Preferred fluorinated polyethers with functional end groups have average molecular weights less than about 10,000 AMU, preferably less than about 8,000 AMU and more preferably from about 1000 AMU to about 6,000 AMU.

Upon exposure to crosslinking conditions, the fluorinated polyethers bind to the carbon layer to form a lubricant layer that does not migrate from the carbon layer. The inhibition of migration is particularly significant with magnetic disc applications where the spinning of the disc tends to remove fluid lubricants over time. Crosslinking within the fluorinated polyether polymers forms a solid layer of lubricant material extending from the carbon surface. Crosslinking increases the hydrophobicity of the lubrication layer, as evidenced by a corresponding increase in the water contact angle of water on the surface, as described further below.

The crosslinking of the lubricant layer is performed with radiation, preferably ultraviolet light. Exposure to radiation induces the bonding of the lubricant compositions to the carbon layer. Further exposure to the crosslinking radiation results in a solid lubricant composition bonded adjacent to the carbon layer. The thickness of the resulting solid lubricant layer can be selected by the exposure time and radiation intensity. A liquid lubricant layer may remain over the solid lubricant, if sufficient radiation is not applied to crosslink the entire thickness of lubrication material. If desired, any remaining liquid lubricant can be removed with a solvent wash.

In some preferred embodiments, the radiation is applied only to selected regions of the surface. The bonding to the carbon layer and the formation of the solid lubrication layer are only formed over the regions of the substrate exposed to the crosslinking radiation. Similarly, different regions of the substrate can be exposed to different amounts of radiation to vary the thickness of the corresponding solid, crosslinked polymer lubricant. The application of the radiation to selected portions of the substrate can be accomplished by blocking radiation from striking portions of the substrate or by the use of a focused radiation source, such as a ultraviolet laser, so that radiation is 3.0 directed only to selected portions of the substrate.

Referring to FIG. 1, an article 100 includes a substrate 102, a carbon layer 104 and a lubricant layer 106. A cross section of article 100 is shown in FIG. 2. Protective carbon layer 104 is located on substrate 102 below a lubricant layer 106, which preferably includes a crosslinked fluoropolyer such as a crosslinked fluorinated polyether.

Substrate 102 can be any material that will support the deposition of a carbon film. Generally, substrate 102 contributes functional properties to the device. The surface of substrate 102 is protected by carbon layer 104. Substrate material 102 can itself be a layer on a further support material. For example, if the object is a magnetic disc, substrate 102 generally includes a layer of magnetic material for data storage, as described further below.

In preferred embodiments, lubricant layer 106 is located at the surface of a magnetic storage disc. Referring to FIG. 3, a lubricant layer 140 is located at a surface of a magnetic storage disc 142. Lubricant layer 140 provides protection against abrasion and the like for a magnetic data storage material. Magnetic storage disc 142 can have any reasonable structure consistent with lubricant layer 140 providing a suitable interface for magnetic storage disc 142.

A cross section of a preferred embodiment of a magnetic storage disc 150 is shown in FIG. 4. A substrate 152 forms the foundation or support structure for storage disc 150. The substrate 152 can be formed from aluminum, aluminum alloy, glass, polymer or other stable non-magnetic material or materials. Aluminum substrates can be plated with Ni—P or the like prior to application of additional layers. Substrate 152 can include multiple layers, if desired. A magnetic layer 154 is located on substrate 152. Magnetic layer 154 is used for data storage on disc 150. Magnetic layer 154 can be formed from a variety of magnetic materials, such as cobalt-based alloys or compounds including, for example, Co—Ni, Co—Cr, Co—Ni—Cr, Co—Pt, Co—Ni—Pt, Co—Cr—Ta, Co—Cr—Pt, Co—Cr—Ni—B, Co—P, Co—Ni—P, other similar materials and mixtures thereof.

A protective carbon layer 156 is located on the magnetic layer 154, opposite substrate 152. An, optional spacer layer 158 and a lubricant layer 160 are located adjacent protective carbon layer 154. Optional spacer layer 158 preferably is formed from a nonmagnetic material and is located between protective carbon layer 156 and magnetic layer 154. Suitable materials for spacer layer 158 include, for example, silicon, germanium, tin, titanium, molybdenum and tungsten. Spacer layer 158 preferably has a thickness from about 1 nm to about 7 nm. Spacer layer 158 can be formed by sputtering or other similar vapor phase deposition approaches. The use of a spacer layer is described further in U.S. Pat. No. 5,871,841, entitled "Magnetic Disk Medium," incorporated herein by reference.

Lubricant layer 160 is used to form a more preferred hydrodynamic interface between a read/write head and magnetic storage disc 150. Following crosslinking, lubricant layer 160 generally is chemically bonded to carbon layer 154. Lubricant layer 160 includes a crosslinked portion 162. Optionally, lubricant layer 160 can include an uncrosslinked portion 164. Uncrosslinked lubricant can be removed as described below. While crosslinked portion 162 and uncrosslinked portion 164 are depicted as distinct layers marked with a dashed line in FIG. 4, the layers may not be clearly physically separated due to interpenetration of the layers.

A magnetic disc with a combination of a thin protective carbon layer and a crosslinked fluorinated polymer layer, as described herein, can be used in a disc drive system. FIG. 5 depicts an embodiment of a disc drive system 200 including drive unit 202, actuator assembly 204 and controller 206. Drive unit 202 includes disc 208 and spindle 210 connected to a spindle motor. In the embodiment shown, actuator assembly 204 includes actuator 212, support arm 214, load beam 216 and gimble/head assembly 218. Actuator 212 controls the position of gimble/head assembly 218 over disc 208 by rotating or laterally moving support arm 214. Load beam 216 is located at the end of support arm 214 and gimble/head assembly 218 is located at the end of load beam 216. Controller 206 instructs actuator 212 regarding the position of support arm 214 over disc 208 and drive unit 202 regarding the control of the spindle motor.

Together the carbon layer and lubricant layer form a protective overcoat for an underlying substrate, such as a magnetic material. In preferred embodiments, the carbon layer is less than about 100 Angstroms thick, preferably less than about 80 Angstroms thick, more preferably less than about 60 Angstroms thick, and more preferably from about 10 Angstroms to about 40 Angstroms thick. The structure of the carbon layer generally depends on the deposition approach. In particular, the carbon layer can be, for example, amorphous, graphitic, diamond-like-carbon, or a mixture thereof. Furthermore, the carbon can be doped to alter the properties of the carbon materials. Suitable dopants include, for example, hydrogen, nitrogen, and combinations thereof.

In particular, the carbon can be deposited in the presence of hydrogen, generally diluted with inert gas, such as argon, to form hydrogen doped carbon. Addition of hydrogen in appropriate amounts maintains the hardness of the carbon layer while decreasing.the elasticity, i.e., increasing the stiffness. The formation of a hydrogen doped carbon with increased wear resistance is described in U.S. Pat. No. 5,397,644, entitled "Magnetic Disk Having a Sputtered Hydrogen-Doped Carbon Protective Film," incorporated herein by reference.

As noted above, a crosslinked fluoropolymer generally is bonded to the carbon layer. The crosslinking of the fluoropolymer is thought to result from the ejection of electrons by the substrate when subjected to crosslinking radiation. Thus, the polymer generally is crosslinked from the surface of the substrate outward. As demonstrated in the examples below, the thickness of the crosslinked polymer increases with increasing ultraviolet illumination time.

Following crosslinking, the crosslinked portion of the substrate is bonded to the underlying carbon substrate. Due to the bonding of the crosslinked polymer with the carbon substrate, the crosslinked polymer will not spin-off of a rapidly rotating disc. Also, the crosslinked polymer is not removed by standard solvents that dissolve the uncrosslinked polymer. Standard solvents include halogenated alkanes, such as 1,1,2-trichloro trifluoroethane and perfluorooctane.

In preferred embodiments, the crosslinked polymer layer has a thickness less than about 30 angstroms, preferably less than about 25 angstroms and more preferably less than about 20 angstroms. The molecular weight of the polymer generally will be correlated with a minimum thickness of the crosslinked fluoropolymer layer. In one approach, lubricant thickness is evaluated from the intensity of the C—F bond stretch absorption from an fourier transform infrared absorption measurement. The absorption intensity is calibrated using standards that are measured by Electron Spectroscopy for Chemical Analysis (ESCA), e.g. X-ray Photoelectron Spectroscopy. The thickness of the crosslinked polymer layer is evaluated following the removal of any uncrosslinked polymer, for example using a solvent or mechanical removal.

The crosslinked polymer layer forms a more hydrophobic layer than the uncrosslinked lubricant. This can be quantified in the form of a water contact angle. The water contact angle is a measure of the hydrophobicity with an increased contact angle indicating that water beads up to greater extent because of increased hydrophobicity. With increased hydrophobicity, the layer provides more corrosion resistance with respect to the underlying materials. In preferred embodiments, the crosslinked fluoropolymer layer has a water contact angle greater than about 100degrees, preferably greater than about 105 degrees and more preferably greater than about 110 degrees. The water contact angle can be measured using available equipment, such as a Automated Goniometer from AST Products, Inc., Billerica, Mass.

Thus, the crosslinked polymers form an effective sealer to supplement corrosion resistance provided by a protective carbon layer. Because of the sealing property of the crosslinked fluoropolymer layer against water-based corrosion, the crosslinked polymer layer can be used effectively with a thinner carbon coating to protect appropriately a magnetic layer against corrosion. In particular, the magnetic layer is protected against forms of corrosion induced by water, including oxidation and metal atom migration. The crosslinked fluoropolymer layer and thin carbon layer work synergistically to provide protection against both damage and wear from contact with the read/write head and corrosion of a magnetic substrate induced by water.

As noted above, the crosslinking can be performed such that the solid, crosslinked fluorinated polymer layer is located over only a portion of the substrate. For example, it may be desirable to form a solid, crosslinked lubricant layer in the data zone of the media, to minimize the probability of fly stiction events while improving corrosion resistance. Alternatively, it may be advantageous to form selectively crosslinked fluorinated polymers in the landing zone of the media, to improve the friction and wear characteristics of the media. Solid, crosslinked lubricant in the landing zone of the disc would be retained during a standard degreasing step, resulting in a stepped topcoat thickness at the edge of crosslinked polymer. Similarly, different regions of the lubrication layer can be exposed to different amounts of crosslinking radiation, such that different thicknesses of solid, crosslinked fluoropolymer are formed at different locations along the substrate surface.

A suitable carbon layer can be deposited by sputtering. Various forms of sputtering can be used, such as facing target sputtering, DC magnetron sputtering, RF magnetron sputtering, DC diode sputtering, RF diode sputtering, or physical vapor deposition sputtering. Other approaches can be used to deposit the carbon layer such as chemical vapor deposition, ion implantation, plasma spraying, plasma enhanced chemical vapor deposition, thermally assisted evaporation, and electron beam assisted vapor deposition.

In a preferred approach to the production of a thin, smooth carbon layer, a thicker carbon layer is applied first to the surface using any desired process or processes, include conventional approaches, such as those described in the preceding paragraph. The relatively thick carbon coating is then etched to remove carbon to produce a desired carbon layer thickness. The etching preferably is performed using oxygen free radicals. The preferred approach to etch the carbon layer with oxygen free radicals involves the use of ozone in combination with ultraviolet light.

Following etching, the carbon film generally has a thickness less than about 100 angstroms, preferably less than about 80 angstroms, more preferably less than about 60 angstroms and even more preferably between about 10 angstroms and about 50 angstroms. The resulting carbon layer following etching is very smooth and very uniform. The production of a thin carbon layer by etching with ozone and ultraviolet light is described in commonly assigned and simultaneously filed U.S. patent application Ser. No., 09/323,514, entitled "Thin Carbon Films," incorporated herein by reference.

Formation of the crosslinked fluorocarbon layer involves two steps. In the first step a layer of uncrosslinked fluoropolymer is applies over a thin carbon coating. In the second step the fluoropolymer is crosslinked. The initial application of the uncrosslinked fluoropolymer can be applied by any of a variety of approaches, such as dipping, brushing, spin coating-and the like. The initial thickness of the uncrosslinked lubricant generally range from about 20 angstroms to about 50 angstroms, and more preferably from about 30 angstroms to about 40 angstroms.

The initial lubricant layer is then crosslinked by exposure to radiation. In particular, the lubricant coated carbon can be exposed to ultraviolet light or electron bombardment. The use of ultraviolet radiation is particularly preferred. Generally, suitable wavelengths for crosslinking the polymer material depends on the chemical nature of the lubricant material and the carbon layer. To crosslink perfluoropolyethers on a carbon layer, ultraviolet light with a wavelength in the range of about 185 nm or less are suitable. A low pressure mercury lamp or a mercury arc lamp are suitable ultraviolet light sources with emissions at about 185 nm.

As noted above, the fluoropolymers can be crosslinked and bonded to the carbon substrate only over a portion of the carbon substrate. Similarly, the thickness of the crosslinked fluoropolymer can be varied over different sections of the carbon substrate. This selective crosslinking to vary the location and/or thickness of the crosslinked polymer layer can be accomplished using a mask to block the crosslinking radiation, such as ultraviolet light, from striking portions of the substrate. Similarly, photoresist can be selectively applied to block light during the ultraviolet irradiation process and subsequently removed in a chemical wash.

Crosslinking and, in some embodiments, bonding of the fluoropolymer to the carbon layer only takes place at locations irradiated with the crosslinking radiation. For example, a mask can be designed to block radiation from reaching the data zone of a magnetic storage disc such that the crosslinking radiation only strikes the landing zone. Use of the mask during the entire crosslinking process results in a bonded, crosslinked fluropolymer layer only over the landing zone of the disc. Use of the mask during only a portion of the crosslinking process results in a thicker crosslinked fluoropolymer layer over the landing zone in comparison with the data zone. Other patterns of crosslinking can be used as desired.

A first set of experiments were preformed with perfluoropolyethers without functional end groups. In these experiments, the water contact angle was measured for various crosslinked polymers. Two different perfluoropolyethanes were used. Ausimont® Z-15 had an average molecular weight of about 15,000, and Ausimont® Z-60 had a molecular weight of about 60,000. The Z-15 polymers had the lightest fractions removed by distilling the composition at 295° C. The crosslinking was performed with a Samco desktop UV/ozone etcher Model UV-1 (Samco Keyoto International, Inc., Japan), having a mercury discharge UV lamp with emissions primarily at 254 nm (85%) and 184 nm (15%). Based on the manufacturer's specifications and the configuration of the apparatus, the intensity at the disc surfaces was assumed to be 54±1 mW.

The lubricant coatings were placed on NiP plated aluminum discs. The discs had a sputtered carbon coating. The carbon coated discs were coated with the uncrosslinked lubricant at a thickness of about 25 angstroms. Then, the coated discs were closed within the unit prior to exposure to ultraviolet light. The unit was purged for two minute with dry nitrogen prior to the start of ultraviolet illumination, and the dry nitrogen purge was continued during the illumination. Selected disc surfaces were irradiated for either 15 seconds, 45 seconds or 90 seconds.

Figure 7:
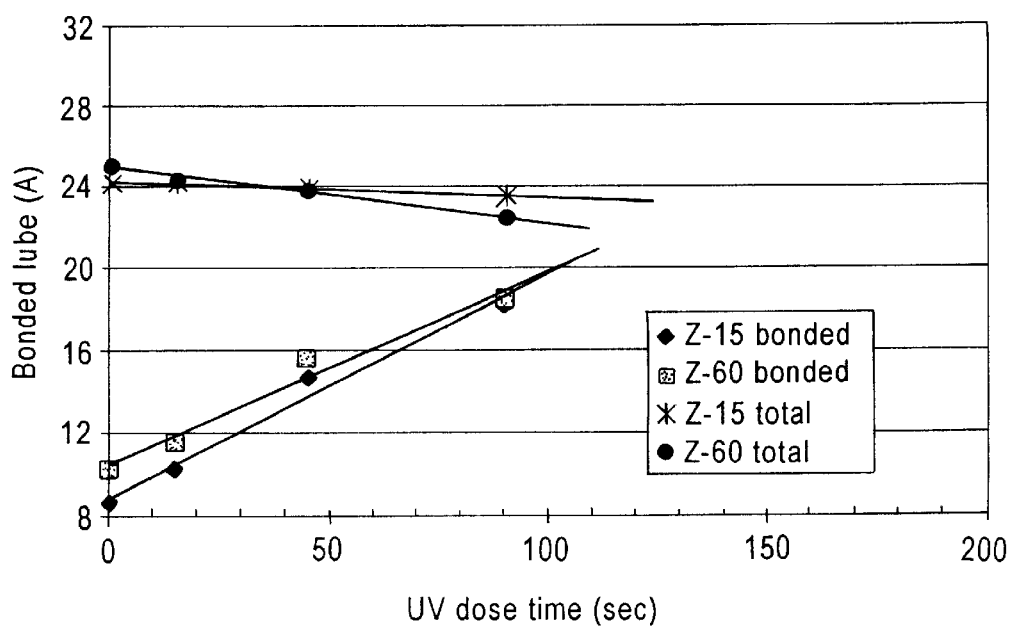
FIG. 7 is a plot of total and crosslinked lubricant thickness as a function of ultraviolet irradiation time for two different perfluoropolyethers.

The resulting water contact angles measured with a goniometer for the lubricant coated discs are given in FIG. 6. The thicknesses were measured following the illumination process. Also, the thicknesses of the crosslinked polymer were measured as a function of ultraviolet irradiation time. To measure the thicknesses of the crosslinked lubricant, the uncrosslinked lubricant is removed by vapor degreasing with perfluorohexane (PF5060, 3M Corp., St. Paul, Minn.). The resulting thicknesses measured by fourier transform infrared spectroscopy are displayed in FIG. 7.

Figure 8:
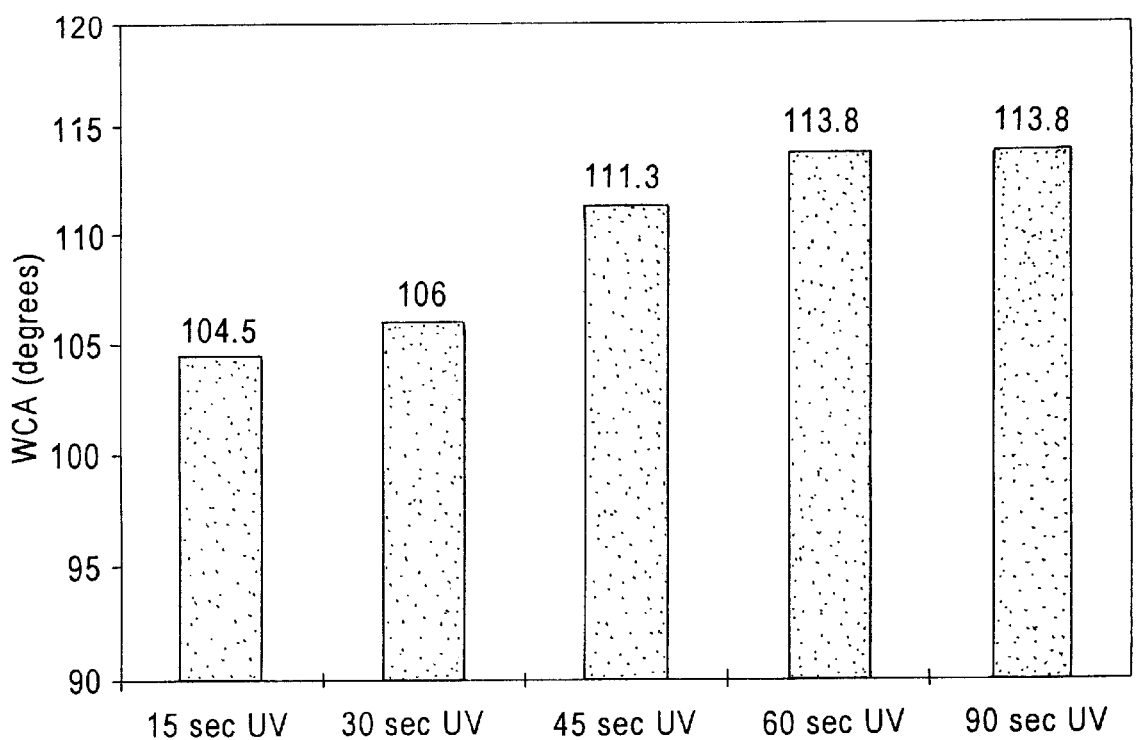
FIG. 8 is a histogram plotting water contact angle as a function of ultraviolet irradiation time for a hydroxyl terminated perfluoropolyether.

Other experiments were performed using alcohol terminated perfluoropolyethers. In these experiments, the lubricant coatings were placed on NiP plated aluminum discs with a sputtered carbon coating. The uncrosslinked lubricant was Ausimont® Z-dol with an average molecular weight of about 5500 Daltons. The measured water contact angle starting with a 35 Angstrom coating of uncrosslinked lubricant are displayed in FIG. 8. The water contact angle of the disc without any crosslinking was 97.1.

Figure 9:
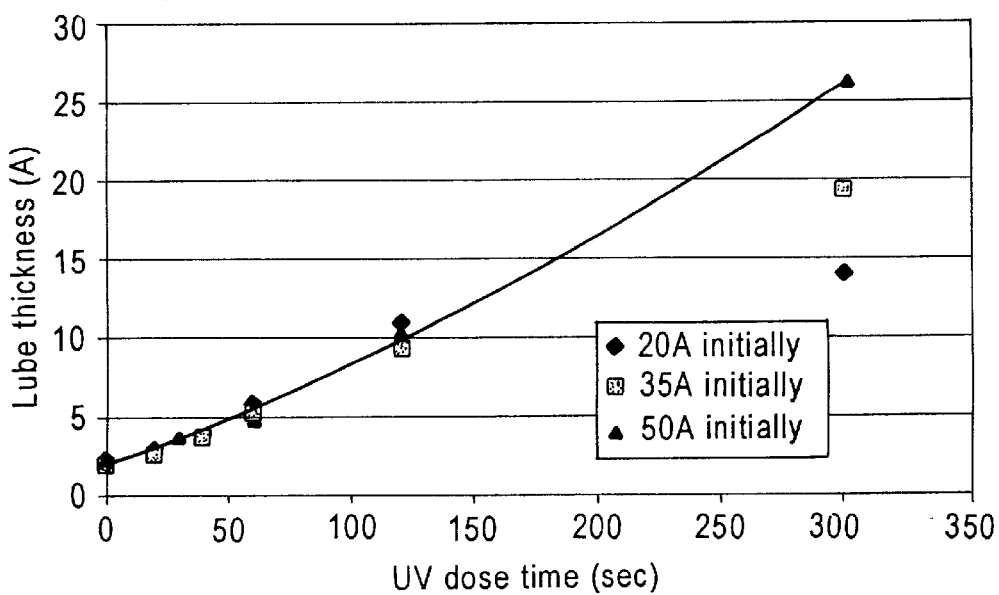
FIG. 9 is a plot of bonded polymer lubricant as a function of ultraviolet irradiation time for a hydroxyl terminated perfluoropolyether with three different initial thicknesses.

Thickness of crosslinked polymer was also evaluated as a function of the thickness of the initial polymer layer using a lower molecular weight alcohol terminated perfluoropolyether, Ausimont® Z-dol, lubricant with an average molecular weight of about 1000 Daltons. The resulting thickness of the bonded, crosslinked lubricant are displayed in FIG. 9. Some uncrosslinked lubricant was lost during the crosslinking process. This loss of uncrosslinked lubricant evidently was due to thermal desorption. For the three initial lubricant thicknesses tested, all three lubricant layers were essentially completely crosslinked following 300 seconds of ultraviolet irradiation.

Additional experiments were performed comparing two different hydroxyl terminated perfluoropolyether polymer lubricants. The first lubricant was the high molecular weight Ausimont® Z-dol with an average molecular weight of about 5500 Daltons. The second lubricant was a Fomblin® Ztetraol lubricant (Ausimont®). Ztetraol lubricant has a diol end group, $CH_2OCH_2CHOHCH_2OH$. Carbon coatings were sputtered onto Hoya® alumino silicate amorphous glass substrates (Hoya Corp., Tokyo, Japan). Two different carbon coating thicknesses were tested, 15 Angstroms and 30 Angstroms. Crosslinking was performed by 15 seconds of UV exposure under the conditions described above.

Figure 10:
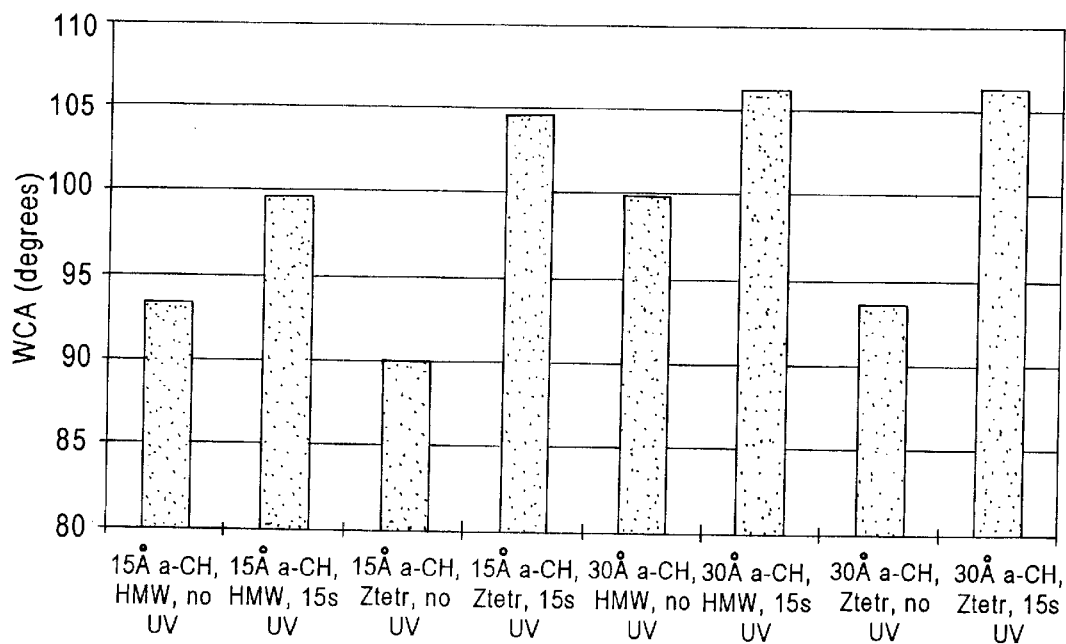
FIG. 10 is a histogram plotting water contact angle for two different hydroxyl terminated perfluoro polyethers with and without ultraviolet irradiation and with two different initial polymer thicknesses.
Figure 11:
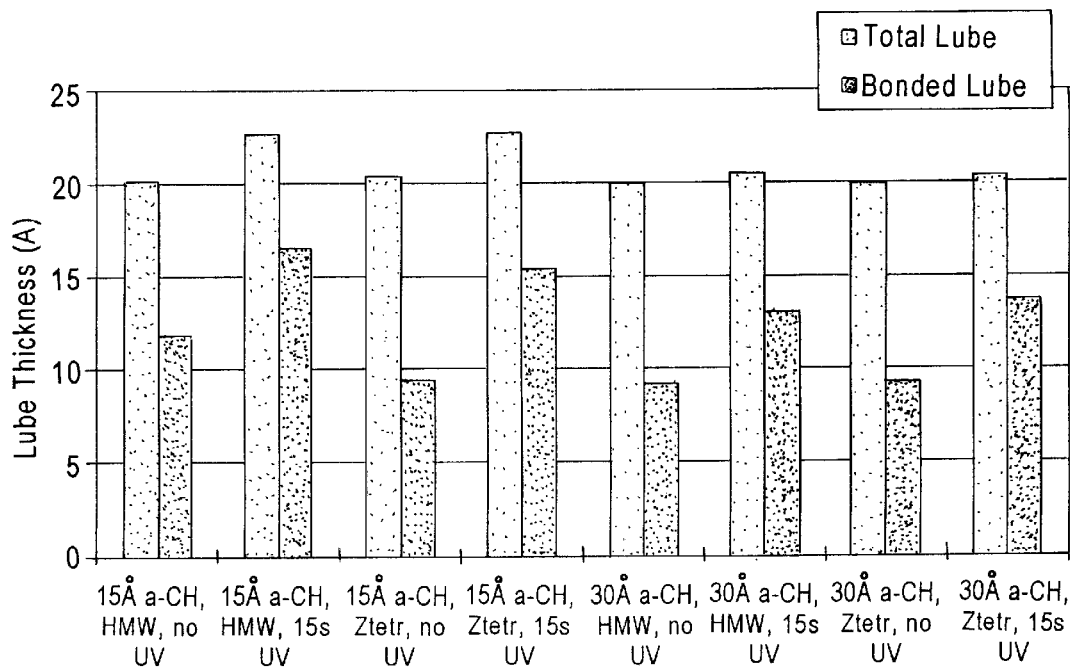
FIG. 11 is a histogram plotting lubricant thickness for two different hydroxyl terminated perfluoro polyethers with and without ultraviolet irradiation and with two different initial polymer thicknesses.

The resulting water contact angles are depicted in FIG. 10. The Ztetraol polymers exhibited greater increases in water contact angle as a result of crosslinking. The corresponding lubricant thicknesses, before and after vapor degrease, are depicted in FIG. 11.

Although the present invention has been described with reference to preferred embodiments, workers skilled in the art will recognize that changes may be made in form and detail without departing from the spirit and scope of the invention.

What is claimed is:

1. A magnetic storage medium comprising a magnetic layer on a substrate, a carbon layer directly on at least a portion of the magnetic layer and a lubricant layer directly on at least a portion of a surface of the carbon layer, wherein the lubricant layer consists of a solid crosslinked fluoropolymer layer having a thickness less than 40 angstroms, wherein the carbon layer has a thickness of less than 50 angstroms, and wherein the crosslinked fluoropolymer layer has a water contact angle of greater than 100 degrees.

2. The storage medium of claim 1 wherein the crosslinked fluoropolymer layer is a crosslinked perfluoropolyether.

3. The storage medium of claim 1 wherein the crosslinked fluoropolymer layer has a thickness less than about 30 angstroms.

4. The storage medium of claim 1 wherein the magnetic layer comprises a cobalt alloy.

5. The storage medium of claim 1 wherein the magnetic storage medium is in the form of a disc.

6. The storage medium of claim 1 wherein the substrate comprises aluminum, aluminum alloy, glass, or a polymer.

7. The storage medium of claim 1 wherein the carbon layer comprises amorphous carbon.

8. The storage medium of claim 1, wherein the crosslinked fluoropolymer layer covers the carbon layer approximately uniformly.

9. The storage medium of claim 1 wherein the crosslinked fluoropolymer layer covers only a portion of the carbon layer.

10. A disc drive system comprising the storage medium of claim 1.

11. A magnetic storage medium comprising:
   a magnetic layer on a substrate;
   a carbon layer having a thickness of less than 50 angstroms directly on the magnetic layer; and
   a lubricant layer having a thickness of less than 40 angstroms directly on the carbon layer, wherein the lubricant layer has a water contact angle of greater than about 100 degrees and consists of a solid crosslinked fluoropolymer.

12. The magnetic storage medium of claim 11 wherein the lubricant layer has a water contact angle of greater than about 110 degrees.

13. The magnetic storage medium of claim 11 wherein the lubricant layer consists of a crosslinked perfluoropolymer.

* * * * *